United States Patent [19]

Noguchi et al.

[11] Patent Number: 4,832,541
[45] Date of Patent: May 23, 1989

[54] GROOVING INSERT

[75] Inventors: Kazuo Noguchi, Itami, Japan; Keith A. Konet, Copley, Ohio

[73] Assignees: Sumitomo Electric Industries, Ltd., Hyogo, Japan; Manchester Tool Company, Akron, Ohio

[21] Appl. No.: 51,828

[22] Filed: May 20, 1987

[51] Int. Cl.$^4$ .............................................. B23B 27/22
[52] U.S. Cl. .................................... 407/114; 407/117
[58] Field of Search .............. 407/113, 114, 117, 115, 407/118; 82/36 R

[56] References Cited

U.S. PATENT DOCUMENTS

| | | |
|---|---|---|
| D. 275,760 | 10/1984 | Cochran . |
| D. 278,716 | 5/1985 | Pano . |
| 2,713,714 | 7/1955 | Krause . |
| 3,254,392 | 6/1966 | Novkov ........................ 407/117 |
| 3,395,434 | 8/1968 | Wirfelt . |
| 3,407,467 | 10/1968 | Wirfelt . |
| 3,656,219 | 4/1972 | Connelly ....................... 407/117 |
| 3,792,514 | 2/1974 | Ushijima ....................... 407/113 |
| 3,815,192 | 6/1974 | Ohtsu . |
| 4,214,845 | 7/1980 | Mori . |
| 4,288,179 | 9/1981 | Krüger ........................... 407/114 |
| 4,304,509 | 12/1981 | Mori ............................. 407/114 |
| 4,340,325 | 7/1982 | Gowanlock .................... 407/117 |
| 4,417,833 | 11/1983 | Wertheimer . |
| 4,441,841 | 4/1984 | Mori . |
| 4,558,974 | 12/1985 | Pano . |
| 4,583,887 | 4/1986 | Wertheimer . |
| 4,597,696 | 7/1986 | Maeda . |
| 4,629,372 | 12/1986 | Huston . |

FOREIGN PATENT DOCUMENTS 59-188105  5/1983  Japan .

OTHER PUBLICATIONS

Manchester Drawing MB-16191-58.
Sumitomo Electric Carbide Inc. Catalog TM 1986 pp. 47-48.
Sumitomo Electric Industries, Ltd. Catalog published 1984, p. 4.
Catalog p. 11, entitled "Cut-Grip Inserts" GIP, undated.

Primary Examiner—Frederick R. Schmidt
Assistant Examiner—Blynn Shideler
Attorney, Agent, or Firm—Watts, Hoffmann, Fisher & Heinke

[57] ABSTRACT

An improved insert 10 for deep grooving, contouring and cut-off operations is disclosed which is provided with two kinds of chip-breaking projections, three in all. There are two frusto-conical projections 30 near the cutting edge 16 and there is a V-shaped projection 32 behind the frusto-conical projections. The insert expands the range of materials of the work, the groove diameters that can be cut and the feeds and speeds of operations, through improved chip control.

10 Claims, 2 Drawing Sheets

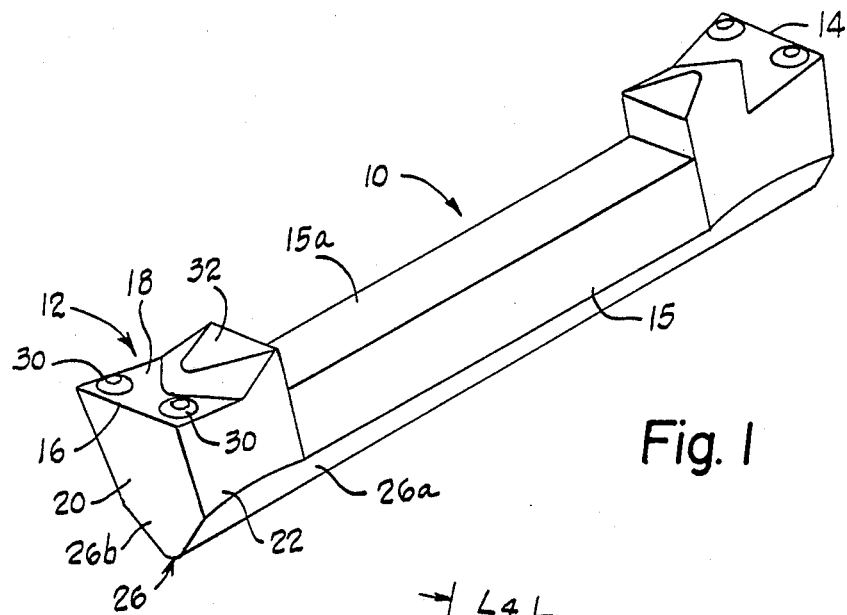
Fig. 1
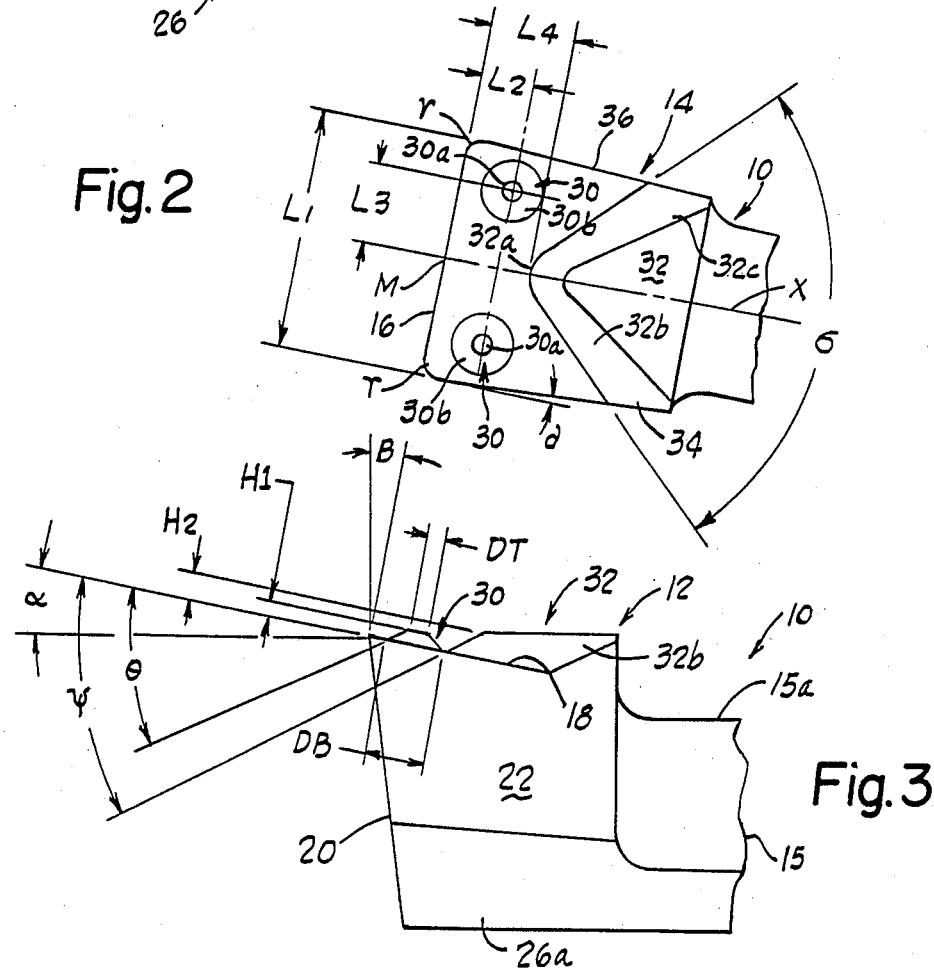
Fig. 2
Fig. 3

1

GROOVING INSERT

BACKGROUND OF THE INVENTION

The present invention relates to an insert intended to be supported on a holder and used in machining for grooving, cut-off or contouring operations; and particularly to an insert suited for deep grooving on various kinds of metals, which often poses a difficult machining problem.

In deep grooving or cut-off operations the depth of cut is large compared with the width of the cutting tool. As a result, chips tend to come out without breaking and wind around the tool or workpiece or both, causing troubles. Therefore, frequently a chip-breaking shelf is formed on the rake face of a grooving insert at a certain distance from the cutting edge with such a gradient as to cause the ejected chips to travel in a desired direction and curl or break into pieces. However, known structures fail to optimize chip breaking over a wide range of material, such as steel of high toughness and low carbon content on the one hand and low toughness and high carbon content on the other, and also over a wide range of tool feeds and cutting speeds.

For example, chips from a workpiece having a low toughness and a high carbon content tend to contact the insert at the point near the cutting edge and more readily curl and break, whereas chips from a workpiece having a high toughness and a low carbon content tend to deform plasticly to a greater extent, curl with a larger radius, and therefore do not break as readily.

DISCLOSURE OF INVENTION

An object of the present invention is to provide a grooving insert which obviates the aforesaid problems and which provides improved chip control, i.e., desired chip contour and effective chip control, over a wide range of materials, feeds and speeds.

The grooving insert according to the present invention is characterized by a straight cutting edge and two identical chip-breaking projections, one adjacent to each of two rake-face corners formed by the cutting edge and two opposite side edges. In its preferred form the insert is further characterized by a third chip-breaking projection midway between, slightly behind, and extending as high or higher from the rake face as the aforementioned two projections. This construction serves to wrinkle the chip formed by the cutting edge to both narrow it, which is advantageous for chip ejection and groove surface finish, and to increase its section modulus, making it stiffer so it more readily breaks as it curls or rotates off the projections and into contact with the workpiece. The height, shape and relationships of the projections with respect to the cutting edge affect the turning radius of the chips and are selected to accommodate a wide range of materials and operating feeds and speeds while achieving the desired chip breaking action.

A preferred V-shape construction of the third chip breaking projection makes the insert of this invention usable in a turning mode along with grooving, and it therefore can be used to contour a workpiece. It can, of course, be used as an effective cut-off tool as well.

Preferred embodiments of the present invention are described with reference to the drawings in which:

BRIEF DESCRIPTION OF THE DRAWINGS

FIG. 1 is a perspective view of a double-ended insert embodying the present invention;

FIG. 2 is a top plan view of one end of the insert of FIG. 1;

FIG. 3 is a side elevational view of the insert end shown in FIG. 2; and,

BEST MODE FOR CARRYING OUT THE INVENTION

Figure 4:
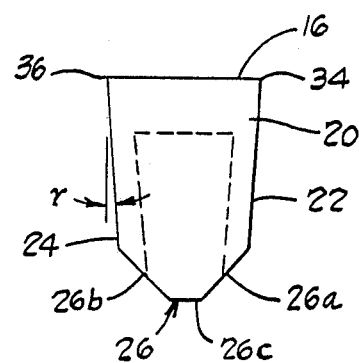
FIG. 4 is a front elevational view of the insert end shown in FIG. 2.

With reference to FIGS. 1–4, an elongated insert 10 embodying the present invention is shown, molded of suitable material, such as tungsten carbide. The insert is indexable, having two duplicate ends 12, 14, and a connecting body portion 15, the top surface 15a of which is recessed. Only the end 12 need be described in detail to provide a complete understanding of the invention.

The end 12 has a relatively narrow and straight transverse cutting edge 16 defined by the intersection of a planar top rake face 18 and a planar front face 20, which form an included angle of fewer than 90°. In the preferred embodiment shown the cutting edge extends at a right angle to the longitudinal extent of the insert. The end 12 has two side faces 22, 24 that converge toward a bottom face 26 that is adapted to be received in a V-shaped notch formed in a holder (not shown, but of the type, e.g., disclosed in U.S. Pat. No. 3,686,729 or 3,825,981). When so received, the insert is secured to the holder by a clamp that engages the top surface 15a. The clamp or other holder component prevents relative longitudinal movement of the insert. The face 26 is of a substantially V-shaped convex shape comprising a surface 26a connecting to one of the side faces 22 and a surface 26b connecting to the other side face 24, these surfaces forming an angle of about 90–120 degrees with each other. It is preferable to cut off the apex portion of the V-shaped convex bottom face as shown at 26c in FIG. 4.

Two identical truncated-conical chip-breaking projections 30 having top surfaces 30a and side walls 30b are formed on the top rake face 18, located symmetrically with respect to a longitudinal line X passing through the midpoint M of the cutting edge 16. A third chip-breaking projection 32 is provided, substantially V-shaped when viewed from top and symmetrical with respect to a longitudinal line passing through the midpoint M of the cutting edge. The projection 32 has an upwardly angled front or nose portion 32a midway between the projections 30, and side walls 32b, 32c, which rise obliquely from the top rake face and extend rearwardly toward side edges 34, 36 formed by the intersection of the rake face 18 with the side faces 22, 24.

A small radius r, typically 0.010 inch, is formed at each intersection of the cutting edge 16 and each of the two side edges 34, 36. The front face 20, side faces 22, 24 and each radius r are ground to provide a smooth surface and sharp cutting edges with the rake face 18, which is not ground, but rather is adequately smooth and accurate as molded.

The sizes and locations of the projections 30, 32 depend upon the width of the cutting edge 16. Taking an insert of a general-purpose 3/16 inch size as an example, a preferred embodiment of the insert of the present invention, with reference especially to FIGS. 2-4, will have the following dimensions and relationships:

| | | |
|---|---|---|
| Length L1 of cutting edge 16 | 3/16 inch | (4.8 mm) |
| Positive top rake angle $\alpha$ | 10° | |
| Front clearance angle $\beta$ | 5° | |
| Side clearance angle $\gamma$ | 5° | |
| Back taper angle $\partial$ | 2° | |
| Projections 30 | | |
| height H1 from rake face | .012 in. | (.30 mm) |
| base diameter DB | .056 in. | (1.42 mm) |
| top surface 30a diameter DT | .014 in | (.36 mm) |
| distance L3 of center from bisector through point M | .060 in | (1.52 mm) |
| distance L2 of center from cutting edge 16 | .043 in. | (1.09 mm) |
| angle $\theta$ of sidewall 30b with rake face | 30° | |
| Projection 32 | | |
| distance L4 of nose 32a from edge 16 | .060 | (1.52 mm) |
| height H2 of nose 32a from rake face | .020 | (.51 mm) |
| angle $\psi$ of nose 32a and sidewalls 32b, 32c with rake face | 30° | |
| angle $\sigma$ between sidewalls 32b, 32c at rake face | 90° | |

It will be understood that these dimensions can vary slightly, while still achieving substantially the same chip control. It should also be understood that for machining materials having characteristics materially different from the usual machinable metals, these dimensions may be different. Also, the diameter of the projections 30 can vary directly for inserts of different widths from that of the example. Standard widths include cutting edges of ⅛ inch (3 mm), ¼ inch (6 mm), 5/16 inch (8 mm) and ⅜ inch (10 mm), along with the 3/16 (4.8 mm) inch width of the above example. By way of illustration, projections 30 having a preferred base diameter of 0.053 to 0.058 inch in a 3/16 inch insert will have a corresponding dimension of 0.040 to 0.045 inch in a ⅛ inch insert, 0.063 to 0.068 inch in a ¼ inch insert, and 0.084 to 0.089 inch in a ⅜ inch insert. Although those dimensions are preferred, the objects of the invention can still be achieved with greater variations. The base diameter DB can vary from about 0.030 inch in the ⅛ inch insert to 0.120 inch in the ⅜ inch insert (1 to 3 mm) and the top diameter DT in the same size range can vary from about 0.007 inch to 0.040 inch (0.2 to 1 mm). Also, the projections 30 can vary in location and size so that the distance L2, between their centers and the cutting edge and the distance L3 between their centers and a bisector of the cutting edge will vary between about 0.030 to 0.150 inch (1 to 4 mm) for the above size range. The distance between the two projections 30 will always be greater than the distance from each projection to the adjacent side edge and to the cutting edge. The nose 32a should be located so that the nose or front end at the rake face 18 will be even with or behind the center of the projections 30 by a distance L4 minus L2 of 0 to 0.080 inch (0 to 2 mm). In the ⅜ inch width insert, the nose portion 32a may have a flat configuration extending about 0.090 inch (2.29 mm) parallel to the cutting edge but still sloped at the angle $\psi$.

The top rake angle $\alpha$ refers to the angle of the top plane 18 that contains the cutting edge 16, with a radius of the workpiece at the point of contact between the insert and workpiece surface, and is generally between 0° and 15° and most typically 10°. The back taper $\partial$ typically varies between 0° and 3°.

While the preferred angle $\theta$ of the side walls 30b and the preferred angle $\psi$ of the nose portion 32a and side walls 32b, 32c are 30°, these angles can be as small as 20° or as great as 35°. The height of the projections 30 varies directly with the distance the projections are spaced from the cutting edge and typically will vary from 0.009 to 0.015 inch (0.23 to 0.38 mm). The height H2 of the third projection 32 from the rake face, while preferably greater, up to 0.025 inch (0.8 mm) greater, than that of the projections 30, is at a minimum the same height as the projections at the nose 32a. The farther back it is from the cutting edge, the greater is its height.

As described above, a preferred grooving insert according to the present invention has three chip-breaking projections of two kinds on the top rake face, at different locations. Workpiece chips, which change their forms with changes in the workpiece diameter and the material and hardness of a workpiece, abut the projections 30 or both the projections 30 and the projection 32, and are effectively shaped, broken and disposed of. By virtue of this, the same insert can be utilized for a wide variety of applications, e.g., with varying finished groove diameters and workpiece materials and hardnesses, without changing the insert geometry. This permits efficient grooving and an economical use of the insert. In addition, contouring is facilitated. That is, the radius r at each intersection of the cutting and side edges, as well as either side edge 34, 36, in combination with the chip-breaking action of the adjacent projection 30 on shallow depth of cuts, and in combination with both the adjacent projection 30 and the adjacent side wall 32b or 32c of the projection 32 in deeper cuts, such as 0.100 inch (2.54 mm) in depth, serve to perform effective contouring or turning operations. This, along with the plunging or grooving operations performed by the edge 16, makes the insert very useful. It will be understood that when the insert is used for grooving, the grooving can be performed on outside surfaces of revolution (so-called O.D. grooving), inside surfaces of revolution (so-called I.D. grooving) or on radial surfaces (so-called face grooving).

While a preferred embodiment of the invention has been described and shown in detail, it will be understood that modifications or alterations may be made therein without departing from the spirit and scope of the invention set forth in the appended claims.

We claim:
1. A grooving insert comprising a body having two duplicate cutting ends and a central recessed clamp-engageable surface, each cutting end having a cutting edge, a top rake face, a front face, two side faces, and a bottom face comprised of a pair of oblique surfaces, one of which connects to one of said side faces and the other of which connects to the other of said side faces, said bottom face being substantially V-shaped so as to be received in a V-shaped notch formed in a holder, and each cutting end further having:
two first chip-breaking projections of a frustoconical shape formed on said rake face and arranged in a symmetrical manner with respect to a longitudinal line extending through a mid point on the cutting edge to concurrently engage and curl a chip in a grooving or cut-off operation, and
a second chip-breaking projection of a substantially V-shape, as viewed from top, formed on said rake face rearward of said first chip-breaking projec- tions, being essentially symmetrical with respect to said longitudinal line, and having an upright rearwardly angled nose portion disposed on said longitudinal line near said first chip-breaking projections and two side walls connected to said nose portion and rising rearwardly and obliquely from said rake face.

2. A grooving insert as claimed in claim 1, wherein each of said first chip-breaking projections has a diameter at its base of 0.030 to 0.120 inch (1 to 3 millimeters) and a diameter at its top of 0.007 to 0.040 inch (0.2 to 1 millimeter) and each has its center at a distance of 0.030 to 0.150 inch (1 to 4 millimeters) both from said cutting edge and said longitudinal line, and said second chip-breaking projection has the base of said nose portion disposed behind the centers of said first chip-breaking projections a distance of 0 to 0.080 inch (0 to 2 millimeters).

3. A grooving insert as claimed in claim 1, wherein the rake angle for said cutting edge is between 0 and 15 degrees, said first and second chip-breaking projections have their side wall inclined at an angle of 20 to 35 degrees with respect to said rake face, and said second chip-breaking projection is higher than said first chip-breaking projections by 0 to 0.025 inch (0.1 to 0.8 millimeter).

4. A disposable insert for use in a tool holder, suitable for grooving, cut-off and contouring operations, said insert comprising:
an elongated body having a V-shaped bottom, two cutting ends and a central recessed clamp-engageable top portion,
a straight cutting edge at each end of the body extending transversely of the body and defined by the intersection of a planar rake face and a planar front face of the body, the included angle between the two faces being less than 90°,
two opposite side surfaces at each end of the body that converge downward from the rake face to provide side clearance, and
means, including first and second identical raised surface portions on each rake face, each adjacent a corner of the respective rake face formed by the cutting edge and a side surface, spaced from the cutting edge and from each side surface, and farther apart from each other than the distance of each to the cutting edge or to the adjacent side surface, for concurrently engaging and curling a chip in a grooving or cut-off operation.

5. An insert as set forth in claim 1 wherein said raised surface portions are tapered away from the rake face and are equidistant from a midpoint of the cutting edge.

6. An insert as set forth in claim 4 including third surface portion at each rake face raised above the rake face midway between and at least as high as the first and second raised portions.

7. An insert as set forth in claim 6 wherein said third surface portion is located farther from the respective cutting edge than are the first and second raised surface portions.

8. An insert as set forth in claim 7 wherein said third surface portion has an inclined leading edge diverging rearwardly from a central nose and extending to the side surfaces.

9. An insert as set forth in claim 4 wherein each cutting end of said insert has a neutral or positive rake, the cutting edge is at a right angle to the longitudinal extent of the body, and the first and second raised surface portions are frustro-conical in shape.

10. An insert as set forth in claim 9 wherein each cutting end includes a third surface portion having a nose midway between the first and second raised surface portions, extending above the rake face at least as far as the first and second raised surface portions, and having an inclined leading edge diverging rearwardly from the nose toward the side surfaces.

* * * * *